US012619371B2

(12) United States Patent
Sun et al.

(10) Patent No.: US 12,619,371 B2
(45) Date of Patent: May 5, 2026

(54) GENERATING DATA MOVEMENT NETWORKS FOR MACHINE LEARNING MODELS

(71) Applicant: Xilinx, Inc., San Jose, CA (US)

(72) Inventors: Hua Sun, San Jose, CA (US); Bryan Bowyer, West Linn, OR (US); Tayyar Rzayev, San Jose, CA (US); Kaushik Barman, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 18/680,779

(22) Filed: May 31, 2024

(65) Prior Publication Data

US 2025/0370647 A1    Dec. 4, 2025

(51) Int. Cl.
*G06F 3/06* (2006.01)

(52) U.S. Cl.
CPC .......... *G06F 3/0646* (2013.01); *G06F 3/0604* (2013.01); *G06F 3/0673* (2013.01)

(58) Field of Classification Search
CPC ..... G06F 3/0673; G06F 3/0604; G06F 3/0646
See application file for complete search history.

(56) References Cited

U.S. PATENT DOCUMENTS

| | | | |
|---|---|---|---|
| 7,869,452 B1 | 1/2011 | Neuendorffer | |
| 8,762,916 B1 | 6/2014 | Kathail et al. | |
| 9,449,131 B2 | 9/2016 | Han et al. | |
| 10,635,622 B2 | 4/2020 | Bilski et al. | |
| 10,747,690 B2 | 8/2020 | Bilski et al. | |
| 10,866,753 B2 | 12/2020 | Noguera Serra et al. | |
| 11,127,442 B2 | 9/2021 | Zhang et al. | |
| 11,336,287 B1 * | 5/2022 | Rodriguez | G06F 15/7825 |
| 11,520,717 B1 * | 12/2022 | Clarke | G06F 13/28 |
| 11,573,726 B1 | 2/2023 | Noguera Serra et al. | |
| 11,733,980 B2 | 8/2023 | Guttag et al. | |
| 11,972,132 B2 | 4/2024 | Noguera Serra et al. | |
| 12,293,174 B1 * | 5/2025 | Stephen | G06F 8/453 |
| 2020/0342350 A1 * | 10/2020 | Madar, III | G06F 12/1036 |
| 2023/0315525 A1 * | 10/2023 | Song | G06F 9/5066 |
| 2023/0336179 A1 * | 10/2023 | Serra | G11C 5/025 |
| 2024/0046015 A1 | 2/2024 | Tibrewala | |
| 2024/0094944 A1 | 3/2024 | Hsu et al. | |
| 2024/0176652 A1 | 5/2024 | Petrica et al. | |
| 2024/0176942 A1 | 5/2024 | Agarwal | |
| 2024/0193225 A1 | 6/2024 | Tiwary et al. | |
| 2024/0303117 A1 * | 9/2024 | Nina Paravecino | G06F 9/5066 |
| 2025/0173309 A1 * | 5/2025 | Abts | H01L 25/18 |

* cited by examiner

*Primary Examiner* — Edward J Dudek, Jr.
(74) *Attorney, Agent, or Firm* — Kevin T. Cuenot

(57) ABSTRACT

Implementing a data movement network includes tiling one or more layers of a machine learning model based, at least in part, on amounts of addressable memory available in different memory levels of a memory architecture of an electronic system. Logical connections specifying compute tiles of the electronic system and logical address spaces corresponding to the compute tiles are generated. Physical connections are generated within the memory architecture by binding ports of direct memory access circuits of the memory architecture to the logical connections. Data transfers for memories between the different memory levels are scheduled based, at least in part, on a loop order of the tiling. Buffers for data of the data transfers are placed within the memories based on the scheduling.

16 Claims, 11 Drawing Sheets

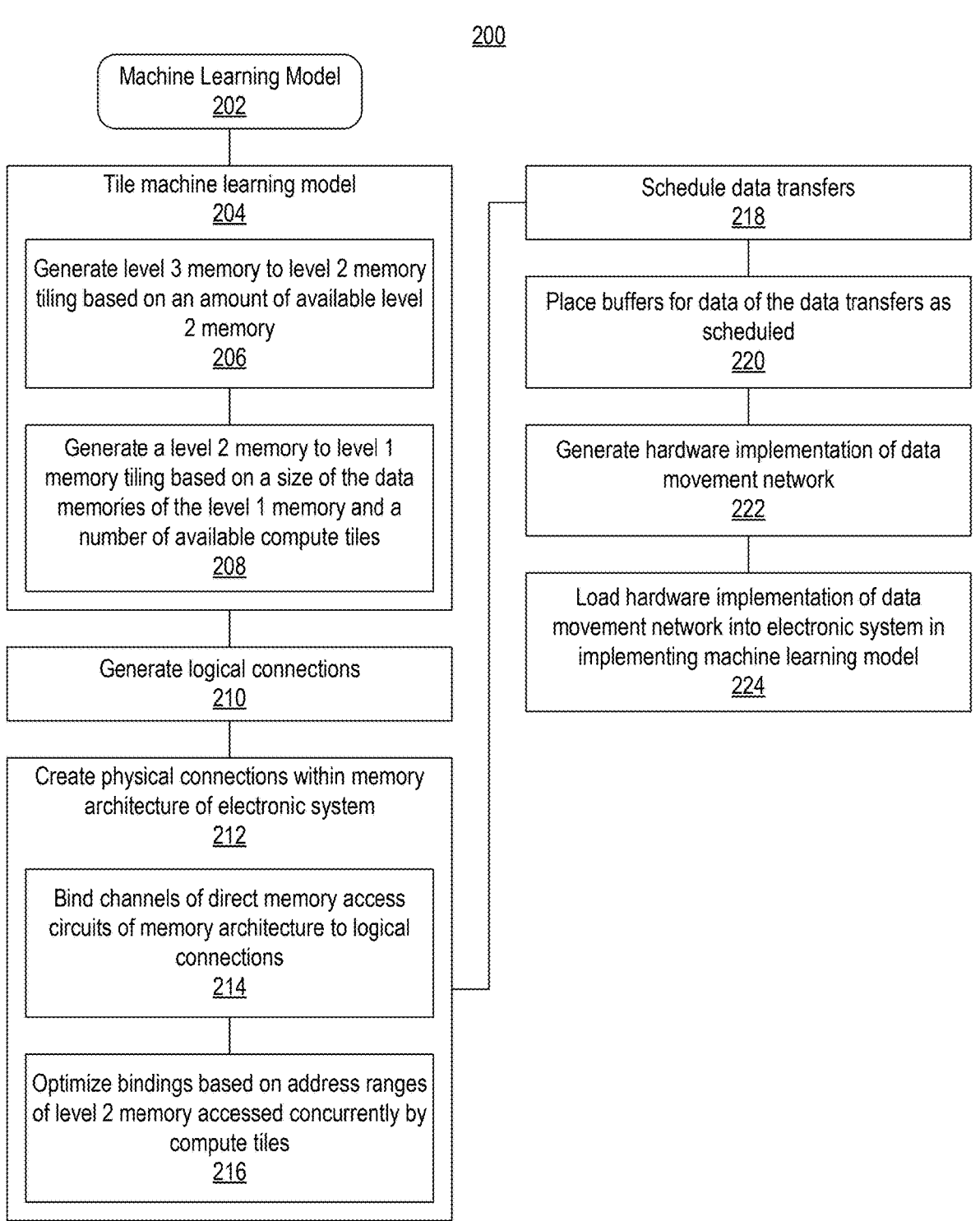

200

Machine Learning Model
202

Tile machine learning model
204

Generate level 3 memory to level 2 memory tiling based on an amount of available level 2 memory
206

Generate a level 2 memory to level 1 memory tiling based on a size of the data memories of the level 1 memory and a number of available compute tiles
208

Generate logical connections
210

Create physical connections within memory architecture of electronic system
212

Bind channels of direct memory access circuits of memory architecture to logical connections
214

Optimize bindings based on address ranges of level 2 memory accessed concurrently by compute tiles
216

Schedule data transfers
218

Place buffers for data of the data transfers as scheduled
220

Generate hardware implementation of data movement network
222

Load hardware implementation of data movement network into electronic system in implementing machine learning model
224

FIG. 2

```
1   for (i=0; i<32; i++)
2   {
3           kernel_functionality(i);
4   }
```
302

204

```
1   for (T3_2=0; T3_2<2; T3_2++)
2           for (T2_1=0; T2_1<4; T2_1++)
3                   for (k=0; k<4; k++
4   {
5                           i=T3_2*15 + T2_1*3 + k;
6                           kernel_functionality(i);
7   }
```
304

402

| [0,3] | [4,7] | [8,11] | [12,15] | [16,19] | [20,23] | [24,27] | [28,31] |

L3 to L2 Tiling | 404-1 | 404-2 |

L2 to L1 Tiling | 406-1 | 406-2 | 406-3 | 406-4 | 406-5 | 406-6 | 406-7 | 406-8 |

Col. 0   Col. 1   Col. 2   Col. 3   Col. 0   Col. 1   Col. 2   Col. 3

112

| OFM2 (Ping) | | |
|---|---|---|
| IFM2 (Ping) | | |
| OFM (Pong) | | |
| IFM2 (Pong) | | |
| IFM (Ping) | WTS (Ping) | |
| WTS (Ping - continued) | | Stack & Heap |
| Stack & Heap (cont.) | IFM (Pong) | WTS (Pong) |
| WTS (Pong – continued) | | |

FIG. 10

GENERATING DATA MOVEMENT NETWORKS FOR MACHINE LEARNING MODELS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to machine learning and, more particularly, to generating data movement networks for machine learning models.

BACKGROUND

Some varieties of hardware platforms include a plurality of interconnected compute circuits. Such hardware platforms are capable of providing significant computational power and a high degree of parallelism. Applications that execute on these platforms, e.g., machine learning models, are often specified in graph form. In general, a graph specifying the machine learning model is formed of a plurality of nodes connected by edges. The nodes represent operations performed on input data and the edges represent communication links that convey data among the nodes.

Because the machine learning model typically consumes a significant amount of data, the ability to efficiently provide data to the various compute circuits and the ability to efficiently output resulting data from the compute circuits has a significant effect on runtime performance and power consumption of the application as executed on the hardware platform.

SUMMARY

One or more embodiments of the disclosed technology are directed to a method of implementing a data movement network. The method includes tiling one or more layers of a machine learning model based, at least in part, on amounts of addressable memory available in different memory levels of a memory architecture of an electronic system. The method includes generating logical connections specifying compute tiles of the electronic system and logical address spaces corresponding to the compute tiles. The method includes creating physical connections within the memory architecture by binding ports of direct memory access circuits of the memory architecture to the logical connections. The method includes scheduling data transfers for memories between the different memory levels based, at least in part, on a loop order of the tiling. The method includes placing buffers for data of the data transfers within the memories based on the scheduling.

One or more embodiments of the disclosed technology are directed to a system for implementing a data movement network. The system includes one or more hardware processors configured to execute operations. The operations include tiling one or more layers of a machine learning model based, at least in part, on amounts of addressable memory available in different memory levels of a memory architecture of an electronic system. The operations include generating logical connections specifying compute tiles of the electronic system and logical address spaces corresponding to the compute tiles. The operations include creating physical connections within the memory architecture by binding ports of direct memory access circuits of the memory architecture to the logical connections. The operations include scheduling data transfers for memories between the different memory levels based, at least in part, on a loop order of the tiling. The operations include placing buffers for data of the data transfers within the memories based on the scheduling.

One or more embodiments of the disclosed technology are directed to a computer program product. The computer program product includes one or more computer readable storage mediums having program instructions embodied therewith. The program instructions are executable by computer hardware to cause the computer hardware to execute operations that implement a data movement network. The operations include tiling one or more layers of a machine learning model based, at least in part, on amounts of addressable memory available in different memory levels of a memory architecture of an electronic system. The operations include generating logical connections specifying compute tiles of the electronic system and logical address spaces corresponding to the compute tiles. The operations include creating physical connections within the memory architecture by binding ports of direct memory access circuits of the memory architecture to the logical connections. The operations include scheduling data transfers for memories between the different memory levels based, at least in part, on a loop order of the tiling. The operations include placing buffers for data of the data transfers within the memories based on the scheduling.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates a method of processing a machine learning model for implementation in a data processing array in accordance with one or more embodiments of the disclosed technology.

FIG. 10 illustrates an example placement of buffers for level 1 memory for a machine learning model in accordance with one or more embodiments of the disclosed technology.

DETAILED DESCRIPTION

Figure 1:
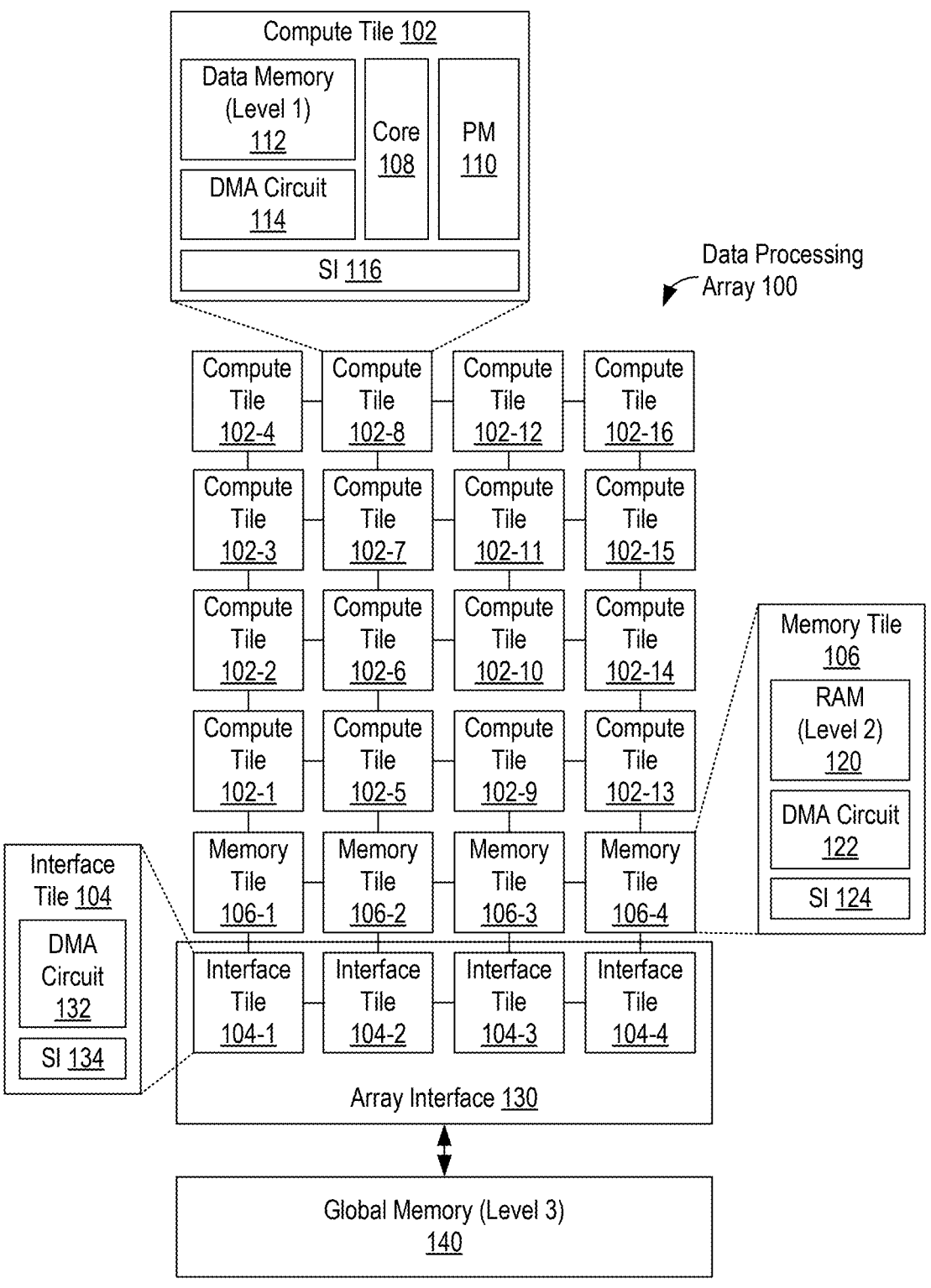
FIG. 1 illustrates an electronic system including a data processing array in accordance with one or more embodiments of the disclosed technology.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to machine learning and, more particularly, to generating data movement networks for machine learning (ML) models. An electronic system may include a data processing array that includes a plurality of compute circuits. The data processing array includes a memory architecture having a plurality of levels. The levels may be hierarchically ordered. The inventive arrangements are capable of implementing a data movement network within the memory architecture of the electronic system. The data movement network is capable of moving data through the multiple levels of the memory architecture in support of the compute circuits executing the ML model or a portion of the ML model.

The particular data movement network that is implemented may be specific to the particular ML model being implemented and particular to aspects of the data processing array itself. For example, the particular implementation of the data movement network will vary based on data access patterns of the ML model. As such, the data movement network implemented for a given data processing array may differ from one ML model to another and may differ for the same ML model depending on the number of compute circuits of the data processing array that are available to execute the ML model. In some cases, for example, the data processing array may be partitioned to execute a plurality of applications concurrently such that only a portion of the data processing array is available to execute the ML model.

In general, implementation of an ML model in a data processing array as described requires allocating circuit resources of the memory architecture to implement data transfers. For example, circuit resources such as direct memory access (DMA) circuits of the different levels of the memory hierarchy must be allocated to particular data transfers supporting operation of the compute circuits. The data transfers also must be scheduled among the levels of the memory architecture to efficiently provide data to the compute circuits as needed and move results out from the compute circuits. Other aspects of creating the data movement network include creating a placement of inputs and outputs, e.g., buffers to store data, consumed and/or generated by the compute circuits in executing the ML model.

Conventional techniques for implementing an ML model using a hardware accelerator utilize a hardware cache and memory addressing. A Graphics Processing Unit (GPU), for example, may use a hardware cache that attempts to anticipate the data needs of the GPU and moves data from global memory into the hardware cache based on the caching scheme. In the event of a cache miss, delays are incurred in bringing any needed data from global memory into the hardware cache for the GPU. Such approaches work with software programming paradigms, but are not viable in other cases. For example, in hardware accelerators that lack caching mechanisms and/or have memory architectures with one or more levels between global memory and local memory for the compute circuits as is the case with the data processing array described herein, hardware caches (e.g., cache memories) are not workable. The hardware caches also consume significant power particularly when replicated across multiple compute circuits and are limited in their capabilities.

The data movement networks generated in accordance with the inventive arrangements disclosed herein account for the memory architecture of the electronic system, performance requirements of the ML model, and/or the data access patterns of the ML model. Unlike conventional data transfer circuitry used for GPUs and/or Central Processing Units (CPUs) that remains static or fixed, the data movement networks generated as described herein specify hardware connectivity. That is, the memory architecture is highly configurable to implement different data movement networks to support ML execution. In this regard, unlike conventional GPU and/or CPU data transfer circuitry, the hardware connectivity is tailored to the specific ML model being implemented and the data processing array itself.

By creating a data movement network specific to the ML model, compute efficiency of the various compute circuits may be increased while minimizing or reducing the overall power consumption of the hardware platform. For example, in implementing the data movement network, the inventive arrangements may seek to utilize as many available DMA circuits as possible, may seek to implement pipelining between data transfers including any data transfers to compute circuits, may seek to keep data in memory as close as possible to the compute circuit(s) that consume the data, and may seek to keep data in memory for as long as possible to maximize data re-use by the hardware platform. Further, the data movement network, as generated, may employ parallelization.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an electronic system including a data processing array 100. The electronic system may be implemented as an integrated circuit (IC). The integrated circuit may be implemented as a single die within a single package or as a plurality of interconnected dies within a single package. Though only a data processing array 100 is illustrated in the example of FIG. 1, it should be appreciated that the electronic system may include one or more other systems, subsystems, and/or circuits that may operate in coordination with data processing array 100. In one or more embodiments, the electronic system and/or data processing array 100 is implemented as a hardware accelerator.

Data processing array 100 may be implemented as a plurality of interconnected tiles. The term "tile," as used herein in connection with a data processing array, means a circuit block. The interconnected tiles of data processing array 100 include compute tiles 102, interface tiles 104, and memory tiles 106. The tiles illustrated in FIG. 1 may be arranged in an array or grid. In one or more embodiments, the tiles are hardwired.

Each compute tile 102 can include one or more cores 108, a program memory (PM) 110, a data memory 112, a plurality of DMA circuits 114, and a stream interconnect (SI) 116. Each data memory 112 is considered a level 1 memory. That is, level 1 memory of data processing array 100 is formed of the data memory 112 of each compute tile 102. Each core 108 is capable of executing program code stored in program memory 110 to operate on data stored in data memory 112. In some embodiments, each core 108 may be implemented as a scalar processor, as a vector processor, or as a scalar processor and a vector processor operating in coordination with one another. For example, the scalar processor may operate as a controller to control operation of the vector processor.

In one or more examples, each core 108 is capable of directly accessing the data memory 112 within the same compute tile 102 and the data memory 112 of any other compute tile 102 that is adjacent to the core 108 of the compute tile 102 in the up, down, left, and/or right directions. Core 108 sees data memories 112 within the same tile and in one or more other adjacent compute tiles as a unified region of memory (e.g., as a part of the local memory of the core 108). This facilitates data sharing among different compute tiles 102 in data processing array 100. In other examples, core 108 may be directly connected to data memory 112 in other compute tiles 102.

Cores 108 may be directly connected with adjacent cores 108 via core-to-core cascade connections (not shown). In one aspect, core-to-core cascade connections are unidirectional and direct connections between cores 108. In another aspect, core-to-core cascade connections are bidirectional and direct connections between cores 108. In general, core-to-core cascade connections allow the results stored in an accumulation register of a source core 108 to be provided directly to an input of a target or load core 108. This means that data provided over a cascade connection may be provided among cores directly with less latency since the data does not traverse the stream interconnect 116 and is not written by a first core 108 to a data memory 112 to be read by a different core 108.

In the example of FIG. 1, each compute tile 102 may be implemented substantially identically to include the same hardware components and/or circuitry. Further, data processing array 100 may include an array of compute tiles formed of any of a variety of processing elements such as digital signal processing engines, cryptographic engines, Forward Error Correction (FEC) engines, or other specialized hardware for performing one or more specialized tasks.

In one or more other examples, compute tiles 102 may not be substantially identical. In this regard, compute tiles 102 may include a heterogeneous mix of compute tiles 102 formed of two or more different types of processing elements. As an illustrative and nonlimiting example, different ones of compute tiles 102 may include processing elements selected from two or more of the following groups: digital signal processing engines, cryptographic engines, FEC engines, or other specialized hardware.

In the example of FIG. 1, data processing array 100 includes one or more memory tiles 106. Memory tiles 106 each may include a random-access memory (RAM) 120, a plurality of DMA circuits 122, and a stream interconnect 124. Each RAM 120 is considered a level 2 memory. That is, level 2 memory of data processing array 100 is formed of the RAMs 120 of the memory tiles 106. Each memory tile 106 may read and/or write to the RAM(s) 120 of one or more adjacent memory tiles 106 by way of the DMA circuit(s) 122 included in the memory tile 106. Further, data can be moved to/from the data memories 112 (e.g., level 1 memory) of any compute tile 102 from/to the RAM 120 (e.g., level 2 memory) of any memory tile 106 via the respective DMA circuits 114 and 122 in the source and target tiles. In doing so, the data is routed through one or more of stream interconnects 116 and 124.

Within this disclosure, memory tiles 106 are characterized by the lack of computational components such as processors (e.g., cores 108 or other circuits capable of executing compiled program code). For example, memory tiles may include only RAM 120, DMA circuits 122, and stream interconnect 124. A core 108 (e.g., a processor and/or processor circuit) is omitted. In this regard, memory tiles 106 (e.g., RAMs 120) are distinct from data memories 112. Memory tiles 106 include DMA circuits 122 that may be programmed or configured to move data as described herein. Memory tiles 106, however, lack computational circuitry to perform operations on data other than reading and/or writing. In the example of FIG. 1, each memory tile 106 may be implemented substantially identically to include the same hardware components and/or circuitry. In one or more other examples, memory tiles 106 may not be substantially identical.

Interface tiles 104 (e.g., interface tiles 104-1, 104-2, 104-3, and 104-4) form an array interface 130 for data processing array 100. Array interface 130 operates as an interface that connects tiles of data processing array 100 to other resources of the electronic system in which data processing array 100 is disposed. In the example of FIG. 1, array interface 130 includes a plurality of interface tiles 104 organized in a row. Interface tiles 104 can include a plurality of DMA circuits 132 and a stream interconnect 134. Interface tiles 104 are connected so that data may be propagated from one interface tile 104 to another bi-directionally. Each interface tile 104 is capable of operating as an interface for the column of tiles directly above and is capable of interfacing such tiles with components and/or subsystems of the hardware platform in which data processing array 100 is disposed.

In the example of FIG. 1, array interface 130 (e.g., one or more of the interface tiles 104) communicatively links a global memory 140 with compute tiles 102 and/or memory tiles 106. Global memory 140 is considered a level 3 memory. That is, level 3 memory of data processing array 100 is formed of RAM that is globally accessible. Typically, global memory 140 is the only memory of the memory architecture of data processing array 100 as formed of level 1, level 2, and level 3 memory that may be directly accessed by a host processor or other entities that may couple with, or communicate with, the electronic system. DMA circuits 132 in interface tiles 104 are capable of accessing global memory 140.

In the example of FIG. 1, global memory 140 is external to (e.g., not part of) data processing array 100. In one example, level 3 memory 140 represents memory that is implemented in the same electronic system (e.g., the same IC) as data processing array 100. That is, level 3 memory 140 may be an "on-chip" memory whether disposed on the same die as data processing array 100 or on a different die than data processing array 100 but within the same IC package. An example implementation of global memory 140 is a High-Bandwidth Memory (HBM). In another example, global memory 140 is external to the electronic system (e.g., IC) in which data processing array 100 is implemented. In that case, global memory 140 may be disposed on the same circuit board as the electronic system including data processing array 100. For example, global memory 140 may be implemented as a Double Data Rate, Synchronous Dynamic Random Access Memory (DDR).

In the example of FIG. 1, array interface 130 may communicatively link compute tiles 102 and/or memory tiles 106 with one or more other subsystems of the IC. Such other subsystems may include, but are not limited to, a network-on-chip, a processor system including one or more hardened processor and/or processor cores, programmable logic, memory controller(s), and/or other Application Specific IC (ASIC) blocks.

In the example of FIG. 1, data processing array 100 does not include cache memory. For example, compute tiles 102, memory tiles 106, and interface tiles 104 do not include cache memories. Each core 108 operates on the assumption that any data that is needed for performing operations is stored in a data memory 112 addressable (e.g., accessible) by a core 108. Any data to be provided from a memory tile 106 to a compute tile 102 is presumed to be available in one or more memory tiles 106. The different levels of the memory architecture of data processing array 100 are cache-less or cache-free meaning that cache hit and/or miss mechanisms and/or procedures are not implemented in any compute tiles 102, memory tiles 106, and/or interface tiles 104 of data processing array 100 as any needed data is presumed to be available in the relevant memory.

By omitting cache memories and cache miss mechanisms, data processing array 100 is capable of achieving predictable, e.g., deterministic, performance. That is, runtimes and performance of applications such as an ML model are predictable. For example, runtime of an application does not change from one iteration to another. Further, significant processing overhead is avoided since maintaining coherency among cache memories that would otherwise be located in different tiles of data processing array 100 is not required. In a further example, cores 108 do not have input interrupts. Thus, cores 108 are capable of operating uninterrupted. Omitting input interrupts to cores 108 also allows data processing array 100 to achieve predictable, e.g., deterministic, performance.

FIG. 1 illustrates an example memory architecture of data processing array 100. In the example, the memory architecture of data processing array 100 is a multi-level memory architecture that includes level 1 memory formed of data memories 112, level 2 memory formed of RAMs 120, and level 3 memory formed of global memory 140. In the example, level 1 memory is the only type of memory, or level of memory, of the memory architecture that is directly accessible (e.g., may be read and/or written) by cores 108 of compute tiles 102. Any data operated by a core 108 must be loaded into a data memory 112 that is addressable (e.g., accessible) by the core 108. In general, data memories 112 are the smallest and fastest memories of the memory architecture of data processing array 100.

Level 2 memory, e.g., RAMs 120, are larger than data memories 112. In general, RAMs 120 are also slower than data memories 112. RAMs 120 may be accessed by compute tiles 102, interface tiles 104, and other memory tiles 106. In general, level 2 memory is used to store data moved from global memory 140 before providing such data to level 1 memory for use by compute tiles 102. Level 2 memory is also used to store results generated by compute tiles 102 that may be reused or moved to global memory 140.

Global memory 140 is the largest memory of the memory architecture. In general, global memory 140 is the slowest of the memories of the memory architecture of data processing array 100. Though global memory 140 is not considered a part of data processing array 100, global memory 140 is considered part of the memory architecture of data processing array 100 as global memory 140 is accessed by tiles of data processing array 100 to transfer data into and out from data processing array 100.

The data flows defined by a graph specifying an ML model must be implemented by creating a data movement network using the memory architecture of data processing array 100. The data movement network defines how data is moved between the various levels (e.g., 1, 2, and/or 3) of the memory architecture. For example, the data movement network that is generated defines how input data moves from global memory 140 to RAMs 120, from RAMs 120 to data memories 112, as well as how output data moves from data memories 112 to RAMs 120, and from RAMs 120 to global memory 140.

In the example of FIG. 1, elements of the memory architecture of data processing array 100 may be programmed to create the data movement network utilized by the ML model. For example, configuration data is generated that, when loaded into control registers of the respective components of data processing array 100 such as DMA circuits 114, DMA circuits 122, DMA circuits 132, stream interconnects 116, stream interconnects 124, and stream interconnects 134, implements or physically realizes the data movement network in the memory architecture.

For purposes of illustration and not limitation, consider an example in which an ML model or portion of an ML model is to be executed on data processing array 100. In order to execute the ML model on data processing array 100, the following operations are performed.

DMA circuits are allocated and bound to connect from level 3 memory to level 2 memory to transfer input data and parameters of the ML model from global memory 140 to memory tiles 106. Input data may include images, video, text, audio, etc. Parameters may include weights, bias(es), configurations, etc.

DMA circuits are allocated and bound to connect from level 2 memory to level 1 memory to transfer the input data and parameters from memory tiles 106 to compute tiles 102 so that compute tiles 102 are able to perform computational tasks such as convolution, matrix multiplication, non-linear functions, etc.

DMA circuits are allocated and bound to connect from level 1 memory to level 2 memory to transfer the output data (e.g., results) generated by compute tiles 102 to memory tiles 106.

DMA circuits are allocated and bound to connect from level 2 memory to level 3 memory to transfer output data, whether intermediate output data or final output data, from memory tiles 106 to global memory 140.

A placement of inputs and outputs (e.g., buffers) for level 2 memory is generated (e.g., buffers are placed).

A placement of inputs and outputs (e.g., buffers) for level 1 memory (e.g., data memories 112) is generated (e.g., buffers are placed).

Data may require partitioning to fit within the level 2 memory and/or the level 1 memory.

The partitioned data is scheduled to move between level 3 memory and level 2 memory and to move between level 2 memory and level 1 memory.

Data movement may be parallelized to increase performance of data processing array 100.

The data movement network that is generated includes a schedule as described above for data movement. The schedule may be generated at compile time and is tailored for the specific ML model being implemented. The schedule may be generated based on a determined lifetime of data (e.g., tensors and/or buffers), inter-layer data re-use patterns specific to the ML model, and/or intra-layer data re-use patterns specific to the ML model. Hardware-based caching algorithms do not account for such factors.

FIG. 2 illustrates an example method 200 of processing an ML model for implementation in data processing array 100. Method 200 is an example methodology for creating or implementing a data movement network for an ML model within data processing array 100. The operations described in connection with FIG. 2 may be performed by a data processing system executing program code. For example, the data processing system may execute a compiler that is capable of generating a version of the ML model that is executable by data processing array 100. The resulting executable ML model may include object code that is executable by particular compute tiles 102 (e.g., cores 108) and configuration data for particular DMA circuits and/or stream switches that implements the data movement network as generated. The compiler may be included in an Electronic Design Automation (EDA) tool that is executed by the data processing system. An example of a data processing system that is capable of performing the operations described within this disclosure is described in connection with FIG. 11.

Referring to FIG. 2, the data processing system (system), as configured or programmed, receives ML model 202 as input. ML model 202 may be specified as an application using source code. The source code is a collection of computer instructions written using a human-readable computer language. In one or more examples, ML model 202 is specified in a programming language such as C/C++, Python, or another similar programming language. In other examples, ML model 202 may be specified using an ML model development platform and/or language. In one or more example implementations, ML model 202, being specified in source code, may specify a graph that is compiled by the system.

In block 204, the system tiles ML model 202. For example, the system is capable of tiling one or more or all layers of ML model 202. The tiling, as performed by the system, is performed based, at least in part, on amounts of addressable memory available in the different memory levels of the memory architecture of data processing array 100. In general, block 204 may be performed for each layer of a plurality of different layers of ML model 202. While the operations described herein pertaining to block 204 tile a particular layer of ML model 202 (e.g., a current layer), it should be appreciated that the process may be repeated for more than one or for all layers of ML model 202.

In block 206, for example, the system generates a level 3 memory to level 2 memory tiling for a current layer of ML model 202 based on an amount of available level 2 memory. For example, the system divides a first iteration space of ML model 202 into a plurality of second iteration spaces based on an amount of memory required for each second iteration space and an amount of available level 2 memory.

Figure 3:
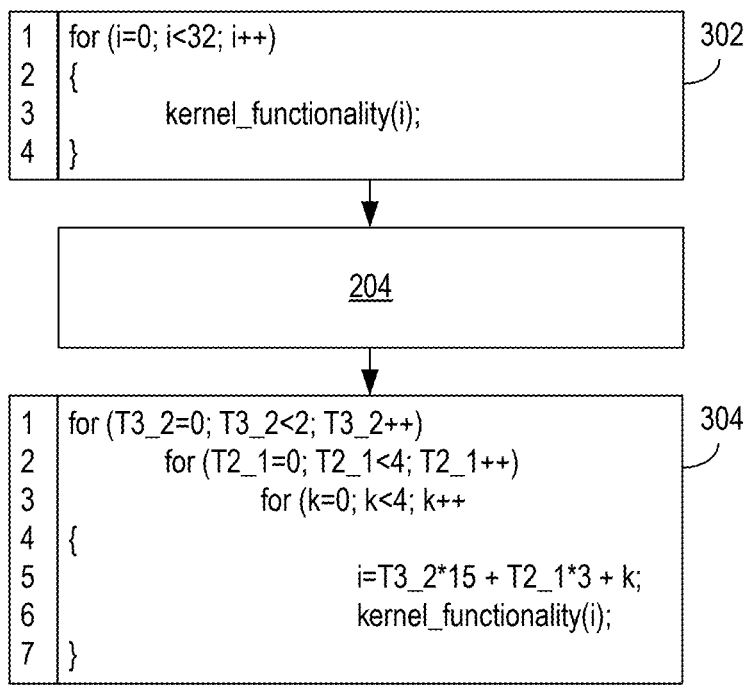
FIG. 3 illustrates an implementation of tiling in accordance with one or more embodiments of the disclosed technology.

FIG. 3 illustrates an example implementation of tiling as performed in block 204. In the example, the system performs tiling on a current layer of ML model 202 illustrated in block 302 resulting in a tiled version of the layer of ML model 202 illustrated in block 304. In the example, the first iteration space is illustrated in block 302 and is defined by line 1 of block 302. The first iteration space is 32 iterations (e.g., 0 to 31). In one or more embodiments, the system analyzes ML model 202 to determine the amount of data needed by each layer and each iteration of the layer. For example, each invocation of "kernel_functionality" for the layer of ML model 202 shown will require an amount of input data, parameters, and generate an amount of output data. Accordingly, the system may determine the amount of this data (e.g., input, output, and parameters) needed to complete all 32 iterations of the first iteration space.

For every layer of ML model 202, level 2 memory will store input data for the current layer (e.g., data obtained from global memory 140 and/or output data generated by a previous layer to be used as input for the current layer), the data generated by compute tiles 102 for the current layer, and parameters (e.g., weights) for the current layer. The data for the current layer must fit within the available memory of level 2 memory. In calculating the available level 2 memory, the capacity of each memory tile 106 is considered. That is, the capacity of each RAM 120 used to implement the ML model 202 is included in the capacity calculation for the available level 2 memory.

Referring to the example of FIG. 1, the available memory of level 2 memory is the sum of the capacity of each RAM 120 of memory tiles 106-1, 106-2, 106-3, and 106-4. It should be appreciated that the actual size of data processing array 100 may be significantly larger than the example provided or smaller so as to have more or fewer compute tiles 102 and/or more or fewer memory tiles 106. Further, in the case where data processing array 100 is larger, data processing array 100 may be partitioned into a plurality of partitions each including fewer compute tiles 102, fewer memory tiles 106, and fewer interface tiles 104 than is included in the entirety of data processing array 100. In that case, each partition may execute a different application such that ML model 202 executes in a portion (e.g., a partition) of data processing array 100 while other partitions of data processing array 100 may execute other applications concurrently with ML model 202. Accordingly, the capacity calculation includes the RAM 120 of each memory tile 106 available for implementing the ML model 202. In other words, each RAM 120 of each memory tile 106 that is available for implementing ML model 202 may be each RAM 120 of a memory tile 106 included in a partition of data processing array 100 dedicated to executing ML model 202.

In one or more embodiments, the system is capable of dividing the first iteration space to ensure that the data that is needed for the resulting second iteration spaces fits within the available memory of the level 2 memory. The second iteration spaces are defined by line 1 of block 304. As an illustrative and nonlimiting example, the system may divide the first iteration space by 2 resulting in two second iterations spaces (e.g., each approximately ½ the size of the first iteration space). In the example of FIG. 3, each second iteration space includes 16 iterations. Each of the second iteration spaces requires memory for storing input data, parameters, and output data for 16 iterations of the "kernel_functionality(i)" function.

The system determines whether each second iteration space fits within the available level 2 memory. In response to determining that each second iteration space fits within the available level 2 memory on an individual basis (e.g., one at a time), the system uses the second iteration space(s) as determined. In response to determining that each second iteration space does not fit within the available level 2 memory on an individual basis, the system divides the first iteration space by 3. The system may iteratively divide the first iteration space by an integer value (e.g., increased by one) until the resulting second iteration spaces fit within the available level 2 memory.

In one or more embodiments, the system is capable of calculating the amount of data (A) that must be stored in the available level 2 memory for a selected layer and the amount of available level 2 memory (B) for the layer and determine ceil(A/B) for the number of second iteration spaces to generate. For purposes of illustration, consider an example in which each RAM 120 is capable of storing 512 KB so that the available level 2 memory in the example of FIG. 2 is 2048 KB. In this example, if the amount of data that must be stored in the available level 2 memory for the layer illustrated in block 302 is 3072 KB, the first iteration space is divided into two second iterations spaces (ceil(A/B) is 2).

In block 208, the system is capable of generating a level 2 memory to level 1 memory tiling based on a size of data memories 112 of the level 1 memory and a number of available compute tiles 102. The number of available compute tiles 102 is the number of compute tiles 102 available for implementing ML model 202 whether the entirety of compute tiles 102 of data processing array 100 or a subset thereof as may be included in a partition of data processing array 100. Accordingly, the system divides the plurality of second iteration spaces into a plurality of third iteration spaces based on a size of the data memories 112 of the level 1 memory and the number of available compute tiles 102.

Referring again to the example of FIG. 3, the system has divided each second iteration space having 16 iterations into 4 third iteration spaces each including 4 iterations 0 through 3 as defined by line 2 of block 304. The iteration spaces defined by the tiling operation of block 204 are implemented as a series of nested or hierarchical loops in which the second iteration spaces are defied by the outer loop corresponding to line 1 of block 304 and the third iteration spaces are defined by next inner loop in the hierarchy of loops (e.g., the middle loop corresponding to line 2 of block 304 in this example).

In one or more embodiments, the system uses a one-to-one mapping of iterations to available compute tiles 102 for performing the level 2 memory to level 1 memory mapping. For example, the second iteration space represents the plurality of iterations of "kernel_functionality" (e.g., 16) that are performed concurrently by compute tiles 102. Once the 16 iterations are complete, a next group of 16 iterations for the layer may be performed with the data needed for those 16 iterations being loaded into the level 2 memory. The system ensures that the data needed to perform one iteration in this example fits within the level 1 memory (e.g., data memory 112) of a single compute tile 102.

In one or more embodiments, the system determines the union of address ranges of iterations for each compute tile 102. The system checks to ensure the DMA circuits 114 for compute tiles 102 are able to access the needed address ranges. The system further checks whether one or more of the address ranges corresponding to different iterations to be performed by a compute tile 102 fit within the data memory 112 of the compute tile at one time. If the data for more than one iteration fits within data memory 112 concurrently, the system may, for example, send the data for more than one iteration to a data memory 112 at a time so long as the data sent fits within the data memory. Alternatively, the system may send the data for one iteration in the event that data for more than one iteration does not fit in data memory 112.

Figure 4:
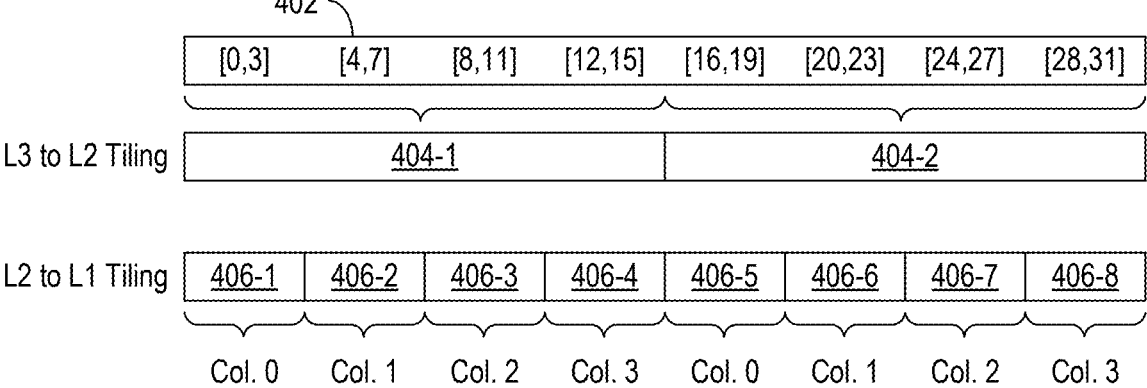
FIG. 4 is a graphical illustration of tiling in accordance with one or more embodiments of the disclosed technology.

FIG. 4 is a graphical illustration of the tiling performed by the system in block 204 of FIG. 2. The first iteration space is illustrated as block 402. The level 3 memory to level 2 memory tiling (illustrated in FIG. 4 as "L3 to L2 tiling") shows that the first iteration space 402 is subdivided into two second iteration spaces 404-1 and 404-2. Second iteration space 404-1 includes iterations 0 through 15, which are broken down into groups of [0:3], [4:7], [8:11], and [12:14]. Second iterations space 404-2 includes iterations 16 through 31, which are broken down into groups of [16:19], [20:23], [24:27], and [28:31].

In the example, each group represents a third iteration space 406. In the example, groups [0:3], [4:7], [8:11], [12:14], [16:19], [20:23], [24:27], and [28:31] correspond to blocks 406-1, 406-2, 406-3, 406-4, 406-5, 406-6, 406-7, and 406-8, respectively. In accordance with the tiling performed and illustrated in FIG. 3, the data required for iterations 0-15 is fully stored in the level 2 memory. In the example, each third iteration space 406 is associated with a particular column of compute tiles 102. For example, third iteration space 406-1 corresponding to iterations [0:3] may be mapped to column 0 of data processing array 100 which includes compute tiles 102-1, 102-2, 102-3, and 102-4. In this example, each iteration of a group may be mapped to a compute tile 102 on a one-to-one basis so that the address range for the iteration to be executed by a compute tile is mapped to that compute tile. The third iteration space 406-2 corresponding to iterations [4:7] may be mapped to column 1 of data processing array 100 which includes compute tiles 102-5, 102-6, 102-7, and 102-8. The third iteration space 406-3 corresponding to iterations [8:11] may be mapped to column 2 of data processing array 100 which includes compute tiles 102-9, 102-10, 102-11, and 102-12. The third iteration space 406-4 corresponding to iterations [12:15] may be mapped to column 3 of data processing array 100 which includes compute tiles 102-13, 102-14, 102-15, and 102-16.

Subsequently, once iterations 0-15 are executed, data for iterations 16-31 may be stored in the level 2 memory, which may overwrite some or all of the previously stored data in level 2 memory. For example, third iteration space 406-5 corresponding to iterations [16:19] may be mapped to column 0 of data processing array 100. The third iteration space 406-6 corresponding to iterations [20:23] may be mapped to column 1 of data processing array 100. The third iteration space 406-7 corresponding to iterations [24:27] may be mapped to column 2 of data processing array 100. The third iteration space 406-8 corresponding to iterations [28:31] may be mapped to column 3 of data processing array 100.

In block 210, the system generates logical connections. Each logical connection may be generated as a data structure that specifies compute tiles of data processing array 100 and logical address spaces corresponding to, or mapped to, the compute tiles. In the example, the level 2 memory to level 1 memory tiling operation of block 208 maps to a logical memory space which is the union of the addressing range of all iterations over L2 to L1 tiling steps. For example, column 0 of compute tiles 102 maps to the union of the addressing range for iterations [0, 1, 2, 3] and [16, 17, 18, 19]. Column 1 of compute tiles 102 maps to the union of the addressing range for iterations [4, 5, 6, 7] and [20, 21, 22, 23], and so forth. In other words, each column of compute tiles 102 maps to the logical memory space formed of the union of the memory space of each iteration to be executed by the compute tiles 102 in that column. Further, as previously noted, each compute tile 102 may be mapped to the particular address range pertaining to the iteration to be executed by the compute tile. For example, compute tile 102-1 may be mapped to the address range of iteration 0 and the address range of iteration 16. Compute tile 102-2 may be mapped to the address range of iteration 1 and iteration 17, and so forth.

In block 212, the system creates physical connections within the memory architecture of the electronic system. For example, in block 214, the system binds DMA circuits of the memory architecture to the logical connections.

Figure 5:
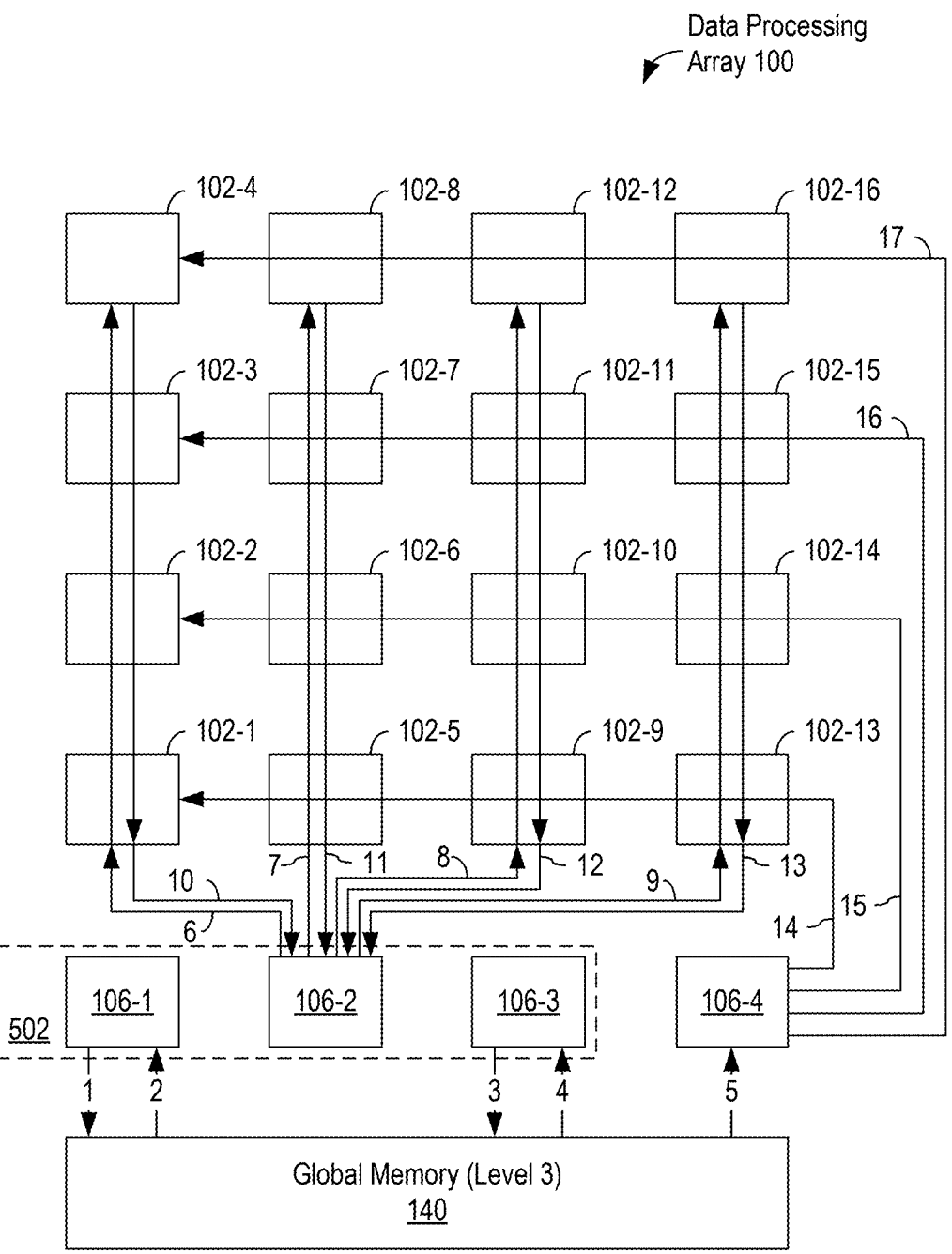
FIG. 5 illustrates an example of a data movement network that is automatically created in accordance with one or more embodiments of the disclosed technology.

FIG. 5 illustrates an example of a data movement network that is automatically created by binding DMA circuits to logical connections for data processing array 100. In the example of FIG. 5, interface tiles 104 are not explicitly illustrated. Each line numbered 1 through 17 represents a physical connection that is formed to perform one or more data transfers. Each physical connection represented by a line numbered 1 through 17 is formed of a read DMA circuit and a different write DMA circuit. The two DMA circuits may be connected by one or more intervening stream switches of any tiles of data processing array 100 being traversed. Each of the physical connections illustrated as lines 1 through 17 is unidirectional.

In general, each DMA circuit is implemented as a read DMA circuit or a write DMA circuit. Each tile may include one or more of each type (i.e., read, write) of DMA circuit. A read DMA circuit, for example, is configured to read data from memory and write the data to a stream switch (e.g., a port of a stream switch). A write DMA circuit is configured to receive data from a stream switch (e.g., a port of a stream switch) and write the data to a memory.

Each of lines 1 through 17 uses a read DMA circuit at the source end from which data is obtained (e.g., the tail of the arrow) and a write DMA circuit at the destination end (e.g., the head of the arrow) to which the data is written. For example, each line uses a read DMA circuit in a circuit (e.g., a tile or global memory as the case may be) connected to the source end of the line and a write DMA circuit in a circuit (e.g., a tile or global memory as the case may be) connected to the destination end of the line.

The physical connections between level 3 memory and level 2 memory are represented by lines 1, 2, 3, 4, and 5. For example, each of lines 2 and 4 represents a physical connection that connects from level 3 memory to level 2 memory to transfer input data (e.g., images, video, text, etc.) from level 3 memory to level 2 memory. Each of lines 1 and 3 represents a physical connection that connects from level 2 memory to level 3 memory to transfer output data from level 2 memory to level 3 memory. Line 5 represents a physical connection that connects from level 3 memory to level 2 memory to transfer parameters (e.g., weights) from level 3 memory to level 2 memory for each layer of an ML model to be executed.

As an example, line 1, which connects from level 2 memory to level 3 memory, uses a read DMA circuit 122 of memory tile 106-1 to obtain data from level 2 memory and a write DMA circuit 132 of interface tile 104-1 to write the data to global memory 140. Other physical connections from level 2 memory to level 3 memory may be implemented in a similar manner. Line 2, which connects from level 3 memory to level 2 memory, uses a read DMA circuit 132 of interface tile 104-1 to obtain data from global memory 140 and a write DMA circuit 122 of memory tile 106-1 to write the data to memory tiles 106. Other physical connections from level 3 memory to level 2 memory may be implemented in a similar manner.

The physical connections between level 2 memory and level 1 memory are represented by lines 6, 7, 8, 9, 10, 11, 12, 13, 14, 15, 16, and 17. For example, each of lines 6, 7, 8, and 9 represents a physical connection that connects from level 2 memory to level 1 memory to transfer input data (e.g., images, video, text, etc.) from level 2 memory to level 1 memory (e.g., to compute tiles 102). Each of lines 10, 11, 12, and 13 represents a physical connection that connects from level 1 memory to level 2 memory to transfer output data from level 1 memory (e.g., compute tiles 102) to level 2 memory.

In this example, each of lines 6, 7, 8, and 9 represents a multi-cast output in that each line sends the same data to multiple, different compute tiles 102. For example, line 6 provides the same data to compute tiles 102-1, 102-2, 102-3, and 102-4. Line 7 provides the same data to compute tiles 102-5, 102-6, 102-7, and 102-8. Line 8 provides the same data to compute tiles 102-9, 102-10, 102-11, and 102-12. Line 9 provides the same data to compute tiles 102-13, 102-14, 102-15, and 102-16. In this example, each multi-cast line provides same data to compute tiles 102 in a same column of data processing array 100. This configuration re-uses data spatially. It should be appreciated that for other ML models and/or data movement networks lines 6, 7, 8, and 9 may convey the same or different data on an individual basis.

As an example, line 6, which connects from level 2 memory to level 1 memory, uses a read DMA circuit 122 of memory tile 106-2 to obtain data from level 2 memory and a write DMA circuit 114 of compute tile 102-1, a write DMA circuit 114 of compute tile 102-2, a write DMA circuit 114 of compute tile 102-3, and a write DMA circuit 114 of compute tile 102-4 to write data to level 1 memory. Other physical connections from level 2 memory to level 1 memory may be implemented in a similar manner. Appreciably, multi-casting may not be needed for each such physical connection.

The output data from each compute tile 102 is collected and gathered vertically and transferred from level 1 memory to level 2 memory by lines 10, 11, 12, and 13. For example, line 10 conveys output data from compute tiles 102-1, 102-2, 102-3, and 102-4 to level 2 memory. Line 11 conveys output data from compute tiles 102-5, 102-6, 102-7, and 102-8 to level 2 memory. Line 12 conveys output data from compute tiles 102-9, 102-10, 102-11, and 102-12 to level 2 memory. Line 13 conveys output data from compute tiles 102-13, 102-14, 102-15, and 102-16 to level 2 memory. In this example, each of lines 10, 11, 12, and 13 carries output data from multiple, different compute tiles (e.g., in a same column in this example).

For example, line 10 may be formed using a read DMA circuit 114 of compute tile 102-1, a read DMA circuit 114 of compute tile 102-2, a read DMA circuit 114 of compute tile 102-3, a read DMA circuit 114 of compute tile 102-2, and a write DMA circuit 122 of memory tile 106-2. Each read DMA circuit 114 obtains data from the data memory 112 in the respective compute tile 102. Other physical connections from level 1 memory to level 2 memory may be implemented in a similar manner. Appreciably, in some cases, a connection may be dedicated for a single compute tile 102 outputting data to level 2 memory.

Each of lines 14, 15, 16, and 17 represents a multi-cast output in that each line conveys data (parameters in this case) to multiple, different compute tiles 102. In this example, same parameters are provided to compute tiles in the same row. For example, line 14 provides the same parameters to compute tiles 102-1, 102-5, 102-9, and 102-13. Line 15 provides the same parameters to compute tiles 102-2, 102-6, 102-10, and 102-14. Line 16 provides the same parameters to compute tiles 102-3, 102-7, 102-11, and 102-15. Line 17 provides the same parameters to compute tiles 102-4, 102-8, 102-12, and 102-16. This illustrates data re-use among parameters. In other examples, lines 14, 15, 16, and 17 may convey the same or different parameters on an individual basis. Appreciably, each of lines 14, 15, 16, and 17 utilizes one read DMA circuit 122 in memory tile 106-4 and a write DMA circuit 114 in each compute tile 102 that receives data on that connection. Switches in the respective tiles facilitate the connections from memory tile 106-4 to the relevant row of compute tiles 102 and down the row horizontally.

The example of FIG. 5 is a data movement network that is automatically generated by the system in accordance with the inventive arrangements based on characteristics of the data processing array 100 which include, but are not limited to, a rectangular shape of R rows and C columns of compute tiles 102 and a rectangular shape of RR rows by CC columns of memory tiles 106. The data movement network is further automatically generated based on characteristics of the ML model which include, but are not limited to, the data access pattern of the ML model.

In the example of FIG. 5, it should be appreciated that each physical connection involving a read DMA circuit and a write DMA circuit in different tiles will include one or more stream switches. That is, each physical connection is formed of the end point DMA circuits and the intervening stream switches of compute tiles 102, memory tiles 106, and/or interface tiles 104 traversed by the respective line.

In the example of FIG. 5, block 502 illustrates an example configuration of memory tiles 106. In the example, memory tiles 106-1, 106-2, and 106-3 function as a single, larger level 2 memory. As discussed in connection with FIG. 1, the DMA circuit 122 of a memory tile 106 may be configured to access the RAM 120 in the same memory tile 106 and the RAM 120 of each adjacent memory tile 106. Thus, the DMA circuit 122 of memory tile 106-2 is able to access the RAM 120 within memory tile 106-1, the RAM 120 in memory tile 106-2, and the RAM 120 in memory tile 106-3.

Accordingly, the connections illustrated by lines 6, 7, 8, and 9 may output data from any of memory tiles 106-1, 106-2, and/or 106-3. Similarly, the connections illustrated by lines 10, 11, 12, and 13 may write data to any of memory tiles 106-1, 106-2, and/or 106-3. By concentrating compute tile 102 accesses to level 2 memory in memory tile 106-2, each compute tile is able to access any data stored in memory tiles 106-1, 106-2, and/or 106-3.

By using physical connections 1, 2, 3, and 4 of memory tiles 106-1 and 106-3 (by way of interface tiles 104-1 and 104-3), bandwidth to global memory is optimized. In the example, memory tile 106-2 has no further DMA resources for data movement between level 2 memory and level 3 memory. Data may be moved from level 3 memory to level 2 memory using two parallel connections that operate concurrently (e.g., lines 2 and 4 of memory tiles 106-1 and 106-3). Similarly, data may be moved from level 2 memory to level 3 memory using two parallel connections that operate concurrently (e.g., lines 1 and 3 of memory tiles 106-1 and 106-3).

Referring to connections 1 and 2, the DMA circuit 122 of memory tile 106-1 is only able to access the RAM 120 therein and the RAM 120 of memory tile 106-2 for conveying data between level 3 memory and level 2 memory. Referring to connections 3 and 4, the DMA circuit 122 of memory tile 106-3 is configured to access the RAM 120 therein and the RAM 120 of memory tile 106-2 for conveying data between level 3 memory and level 2 memory. Because the DMA circuit 122 of memory tile 106-2, however, is capable of accessing the RAM 120 of each of memory tiles 106-1, 106-2, and 106-3, the compute tiles 102 have access to the entirety of block 502.

By comparison, if a DMA circuit in memory tile 106-1 was used to convey data between level 2 memory and level 1 memory instead of the DMA circuit of memory tile 106-2, compute tiles of column 0 (e.g., compute tile 102-1, 102-2, 102-3, and/or 102-4) would be unable to access RAM 120 of memory tile 106-3 as memory tile 106-3 is not adjacent to the DMA circuit of memory tile 106-1. In the configuration shown, the DMA circuit of memory tile 106-2 is capable of accessing the RAM 120 therein and the RAMs 120 of memory tiles 106-1 and 106-3. Memory tile 106-4 is independent using its own DMA circuit to access compute tiles as memory tile 106-4 provides weights which have a different data access pattern than the input data provided to compute tiles 102 and the output data received from compute tiles 102.

Figure 6:
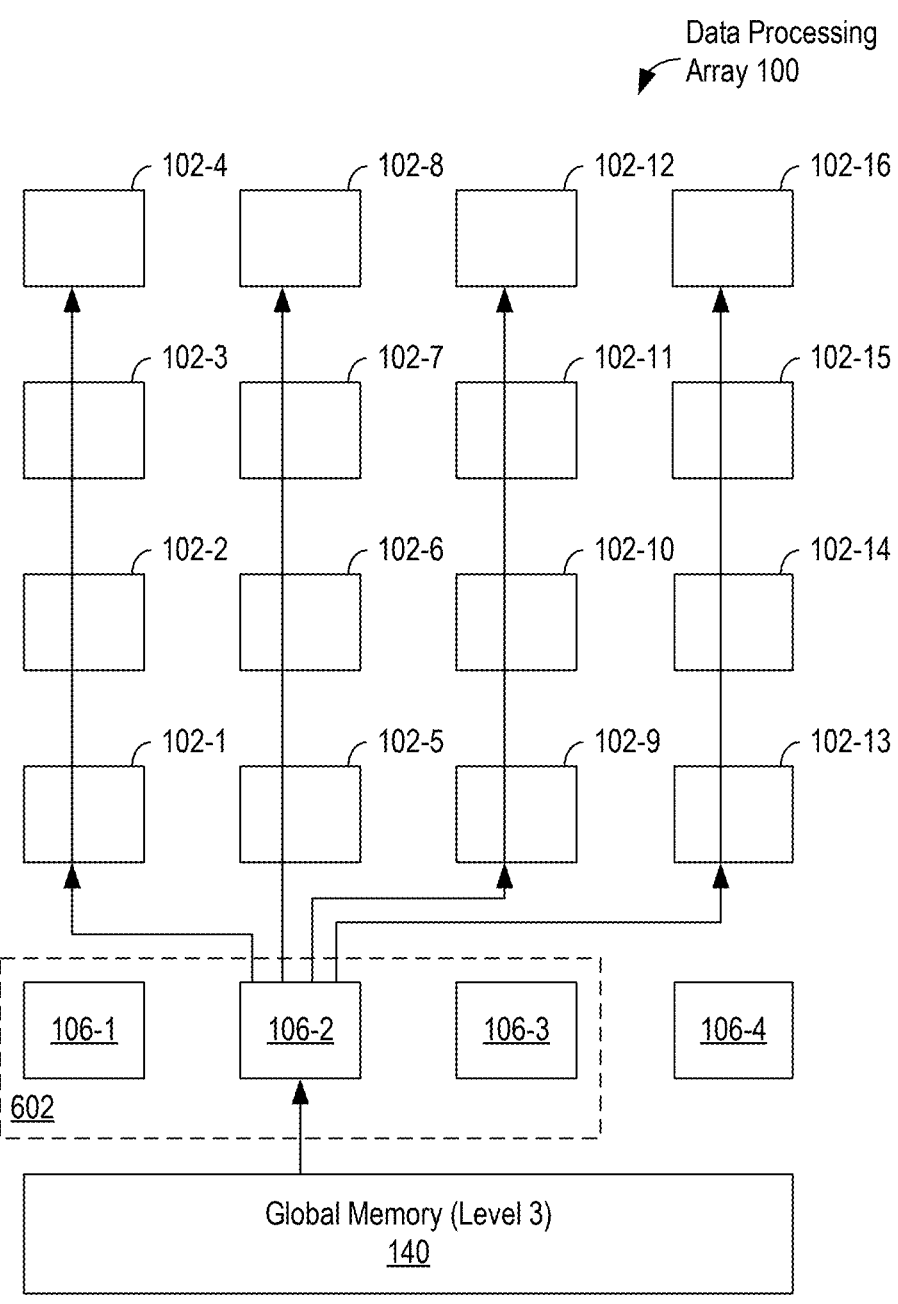
FIG. 6 illustrates another example of a data movement network that is automatically created in accordance with one or more embodiments of the disclosed technology.

FIG. 6 illustrates another example of a data movement network that is automatically created by the system. The data movement network of FIG. 6 may be automatically created by binding ports of DMA circuits to logical connections for data processing array 100. In the example of FIG. 6, interface tiles 104 are not explicitly illustrated. Further, only connections for conveying data from level 3 memory to level 2 memory and connections for conveying data from level 2 memory to level 1 memory are illustrated. The lines shown represent physical connections formed to perform data transfers. Like in FIG. 5, each physical connection represented by a line is formed of a read DMA circuit and a write DMA circuit in different tiles with one or more intervening stream switches. Each of the physical connections illustrated is unidirectional.

In the example of FIG. 6, block 602 illustrates an example configuration of memory tiles 106 that is substantially similar to that illustrated in FIG. 5. In the example, memory tiles 106-1, 106-2, and 106-3 function as a single, larger level 2 memory. As the amount of data to be stored in level 2 memory only requires 3 memory tiles, memory tile 106-4 is not required. Further, as each memory tile may access the RAM of an adjacent memory tile, the DMA circuits of a single memory tile (e.g., memory tile 106-2) may be used to convey data to the compute tiles 102.

Figure 7:
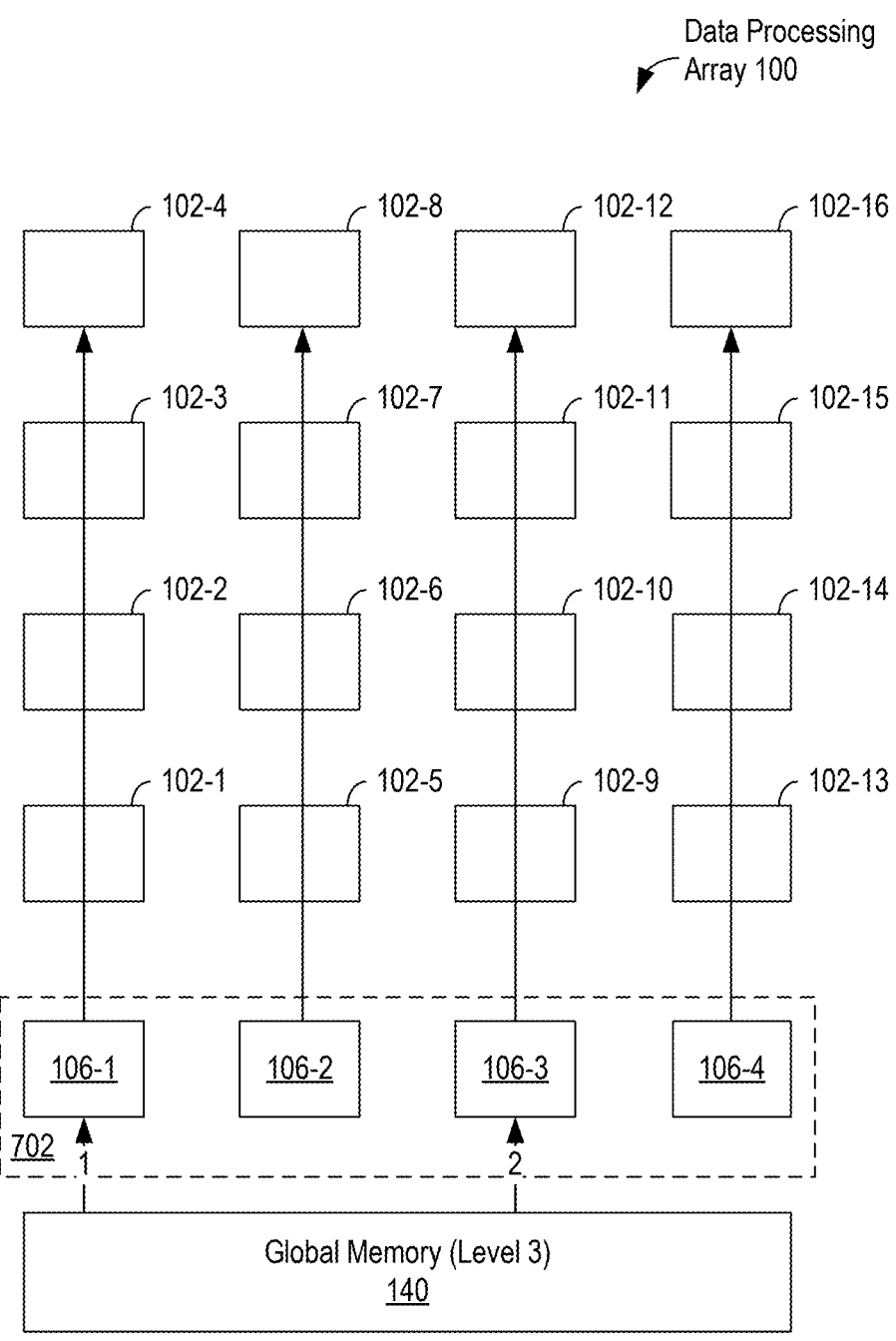
FIG. 7 illustrates another example of a data movement network that is automatically created in accordance with one or more embodiments of the disclosed technology.

FIG. 7 illustrates another example of a data movement network that is automatically created by the system. The data movement network of FIG. 7 may be automatically created by binding ports of DMA circuits to logical connections for data processing array 100. In the example of FIG. 7, interface tiles 104 are not explicitly illustrated. Further, only connections for conveying data from level 3 memory to level 2 memory and connections for conveying data from level 2 memory to level 1 memory are illustrated. The lines shown represent physical connections formed to perform data transfers. Like in FIG. 5, each physical connection represented by a line is formed of a read DMA circuit and a write DMA circuit with one or more intervening stream switches. Each of the physical connections illustrated is unidirectional.

In the example of FIG. 7, block 702 illustrates that all four memory tiles 106 are utilized thereby providing more storage for data to be provided to compute tiles 102 as input than was the case in FIG. 6. Further, DMA circuits in each of memory tiles 106-1, 106-2, 106-3, and 106-4 are utilized to convey data to compute tiles 102. DMA circuits in memory tiles 106-1 and 106-3 are used to convey data from global memory 140 to level 2 memory. For example, connection 1 is capable of moving data from global memory 140 into memory tiles 106-1 and 106-2. Connection 2 is capable of moving data from global memory 140 into memory tiles 106-3 and 106-4. Though not the case in this example, connection 2 may be configured to move data from global memory 140 into memory tiles 106-2, 106-3, and 106-4.

For purposes of illustration, in the case where each memory tile 106 is capable of storing 512 KB of data, the examples of FIGS. 5 and 6 each use approximately 1.5 MB of level 2 memory. The example of FIG. 7 uses approximately 2 MB of level 2 memory. The apportionment of DMA circuits to connections, e.g., the mapping and binding processes, must support the partitioning of data to memory tiles 106 and must support access by the compute tiles 102 to the needed address ranges.

Continuing with FIG. 2, in block 216, the system optimizes the bindings based on the address ranges of level 2 memory accessed concurrently by compute tiles 102. For example, the DMA circuits are bound to the logical connections based, at least in part, on address ranges of level 2 memory accessed by the compute tiles 102 concurrently. In the example of FIG. 5, at least initially, the system may allocate separate physical connections between level 2 memory and each of compute tiles 102-1, 102-2, 102-3, and 102-4. Accordingly, with respect to line 6, a write DMA circuit in each compute tile 102-1, 102-2, 102-3, and 102-4 is used. Also, owing to the 4 different physical connections being formed, 4 read DMA circuits in level 2 memory are needed to supply data to compute tiles 102-1, 102-2, 102-3, and 102-4.

In this example, as part of block 216, the system may analyze the address ranges of level 2 memory accessed by each of compute tiles 102 and determine that compute tiles 102-1, 102-2, 102-3, and 102-4 each access the same data from level 2 memory and do so concurrently (e.g., simultaneously). In response to detecting this condition, the system combines the separate physical connections into one physical connection so that a single read DMA circuit of level 2 memory is used with the multi-cast feature to provide the same data concurrently to each of compute tiles 102-1, 102-2, 102-3, and 102-4. A similar procedure may be performed for the other columns of compute tiles corresponding to lines 7, 8, and 9. A similar procedure may be performed with respect to lines 14, 15, 16, and 17 albeit with respect to rows of compute tiles and parameters. Finally, compute tiles 102 in same columns of data processing array 100 may be configured to provide output results to a same write DMA circuit of level 2 memory.

Accordingly, the optimization may include, for two or more compute tiles located in a same column that access same address ranges in level 2 memory concurrently, combining the physical channels so that data is provided to the two or more compute tiles from the level 2 memory using a same read DMA circuit of the level 2 memory.

Continuing with FIG. 2, in block 218, the system schedules data transfers. For example, the system schedules data transfers for memories of the different memory levels of the memory architecture based, at least in part, on a loop order of the tiling and the address ranges consumed or used for the computations to be performed by compute tiles 102. Referring to the example of FIGS. 3 and 4, the data corresponding to iteration space 404-1 is scheduled for loading into level 2 memory first. The data of iteration space 404-1 is scheduled for transfer to level 1 memory subsequent to loading into the level 2 memory. Results generated by compute tiles 102 initially stored in level 1 memory are transferred to level 2 memory. Any output data in the level 2 memory that is to be stored in level 3 memory may then be transferred to level 3 memory.

Once the data of iteration space 404-1 is processed, data for iteration space 404-2 is loaded into level 2 memory. The data of iteration space 404-2 is scheduled for transfer to level 1 memory subsequent to loading into the level 2 memory. Results generated by compute tiles 102 initially stored in level 1 memory are transferred to level 2 memory. Any output data in the level 2 memory to be stored in level 3 memory may then be transferred to level 3 memory. This process may be performed for each of the layers of the ML model resulting in a schedule of the data to be loaded and unloaded into the different levels of the memory hierarchy.

The system is also capable of scheduling data transfers based on any data dependencies that may exist. For example, in response to detecting a dependency between two portions or items of data, the system sequences data transfers in sequence. That is, the system schedules data transfers so that any data that is dependent on other data is sequenced (e.g., scheduled) for transfer after the data upon which the data depends. In response to detecting that two (or more) data transfers have no dependency, the system is capable of scheduling the data transfers in parallel if sufficient hardware resources are available for implementing the parallel data transfers.

The system is also capable of detecting dependency between data and layer execution. In response to detecting that a selected layer of the ML model is dependent on certain data, the system will schedule execution of the selected layer after the transfer of the data upon which execution of the selected layer depends. In response to detecting no dependency between data and the selected layer, the system need not schedule the data transfer prior to execution of the selected layer. As an illustrative and non-limiting example, if there is no dependency between a set of parameters and the execution of the selected layer, the selected layer may execute prior to the transfer of the set of parameters.

In block 220, the system places buffers for data of the data transfers within the memories. The system places buffers for data of the data transfers based on the scheduling. The buffer placement is performed for the level 2 memory as well as for the level 1 memory. In placing buffers, whether within level 2 memory or in level 1 memory, the system uses several metrics. One metric is that data should be kept in a memory for as long as possible to avoid reloading the same data back into the memory. For example, if the data generated as output of a layer of the ML model is to be used for a next or subsequent layer (e.g., as input), the buffer placement will keep that output data in the memory to be used as input for that next layer of the ML model to avoid reloading the data.

Figure 8:
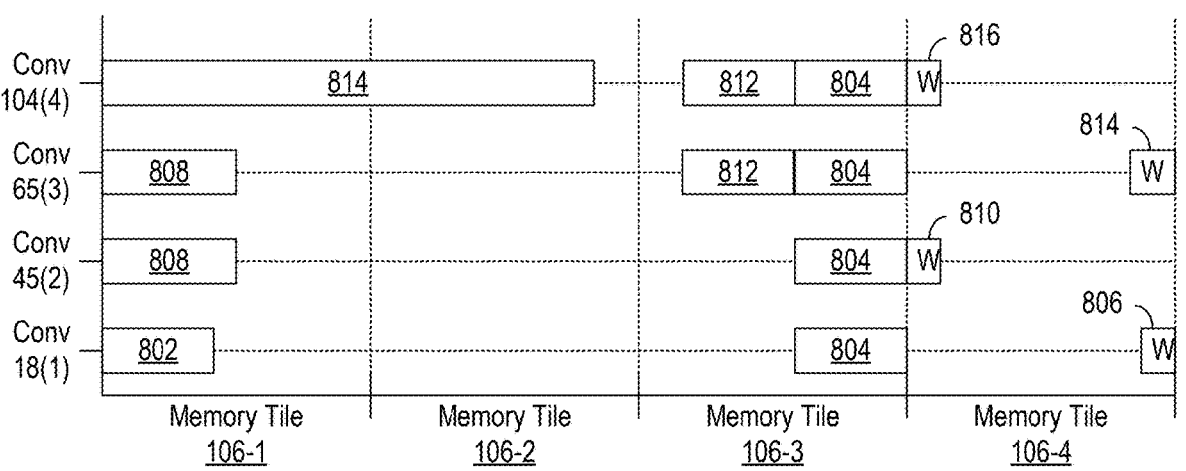
FIG. 8 illustrates an example placement of buffers for level 2 memory for a machine learning model in accordance with one or more embodiments of the disclosed technology.

FIG. 8 illustrates an example placement of buffers for level 2 memory for an ML model. In the example, each segment on the horizontal axis corresponds to the memory space of a particular memory tile 106. On the vertical axis, different layers of a neural network are illustrated with the particular layer indicated in parenthesis. In the example, 4 layers of a neural network are illustrated with each layer being a convolution layer. For purposes of illustration, each row, which corresponds to a layer, represents a state of the level 2 memory for the time during which the respective layer is being processed.

In the example, a portion of a Resnet50 ML model is illustrated. In the example, the output of layers in the ML model that become input for a next layer and/or for later layers may be preserved to the extent possible given the space requirements of consecutive layers and the space available in level 2 memory. The buffer placement process performed by the system for the level 2 memory assigns an address in the level 2 memory for the output of each layer, for parameters (e.g., weights) of each layer, and for the input to each layer. To improve runtime performance of the ML model on data processing array 100, the system generates a buffer placement for level 2 memory that retains the buffer in the level 2 memory for as long as possible to re-use that data between two or more layers of the ML model.

The buffer placement is performed based, at least in part, on the tiling and the scheduled data transfers. Within this disclosure, the act of placing a buffer means assigning the buffer an offset within a particular memory tile 106 (e.g., an offset within a RAM 120 of a particular memory tile 106). Referring to layer 1 of the ML model, the system places placed buffer 802 at offset 0 of memory tile 106-1, a buffer 804 at an offset in memory tile 106-3, and a buffer 806 at an offset of memory tile 106-4. Buffer 802 is placed to receive input data for the first layer (e.g., an input feature map) of the ML model obtained from level 3 memory. Buffer 804 is placed to receive output generated by compute tiles 102 in executing the first layer of the ML model. Buffer 806 is placed to store the weights obtained from level 3 memory as needed by the compute tiles 102 to execute the first layer of the ML model.

For layer 2 of the ML model, the system places buffers 804, 808, and 810. Buffer 804 is kept or maintained unchanged from the first layer. That is, the output data generated by layer 1 is used as the input data for layer 2 of the ML model illustrating data re-use. In the example, using the same number designation for a buffer from one layer to another means that the data is kept or maintained unchanged to be re-used for the next layer. Accordingly, buffer 804 is maintained in memory tile 106-3 and is designated as an input buffer for layer 2. Buffer 808 is placed at offset 0 of memory tile 106-1 to store output data generated by compute tiles 102 for layer 2 of the ML model. Buffer 808 effectively overwrites buffer 802 as the system determines that the data in buffer 802 is not needed for layer 2 or other layers. Buffer 810 is placed at an offset in memory tile 106-4 to store weights obtained from level 3 memory as needed by the compute tiles 102 to execute layer 2 of the ML model.

For layer 3 of the ML model, the system places buffers 804, 808, 812, and 814. Buffers 804 and 808 are kept or maintained unchanged from the prior layer. In the example, layer 3 takes as input the input data provided to layer 2 (e.g., buffer 804) and the output data generated by layer 2 (e.g., buffer 808). Accordingly, buffers 804 and 808 are used as input buffers for layer 3. Buffer 812 is placed in memory tile 106-3 to store output data generated by compute tiles 102 for layer 3 of the ML model. Buffer 812 does not overwrite buffer 804. Buffer 814 is placed in memory tile 106-4 to store weights obtained from level 3 memory as needed by the compute tiles 102 to execute layer 3 of the ML model.

For layer 4 of the ML model, the system places buffers 804, 812, 814, and 816. Buffers 804 and 812 are kept or maintained unchanged. In the example, layer 4 takes as input the input data provided to layer 2 (e.g., buffer 804) and the output data generated by layer 3 (e.g., buffer 812). Accordingly, buffers 804 and 812 are used as input buffers for layer 4. Buffer 814 is placed in memory tile 106-1 and memory tile 106-2 to store output data generated by compute tiles 102 for layer 4 of the ML model. Buffer 816 is placed in memory tile 106-4 to store weights obtained from level 3 memory as needed by the compute tiles 102 to execute layer 4 of the ML model.

In the example of FIG. 8, each layer uses different weights. Accordingly, each of weight buffers 806, 810, 814, and 816 represents a different weight buffer (e.g., storing different weights therein for the respective layer of the ML model).

The system is capable of deciding buffer placement for each layer of the ML model on a layer-by-layer basis depending on which data is re-used from one layer to the next, which data is no longer needed, and how much memory is available for continued storage of data to allow data to survive in level 2 memory for two or more layers of the ML model. Data that is not needed may be kept, for example, except in cases where space is needed to store data (input, output, and/or parameters) needed for a next layer.

Figure 9A:
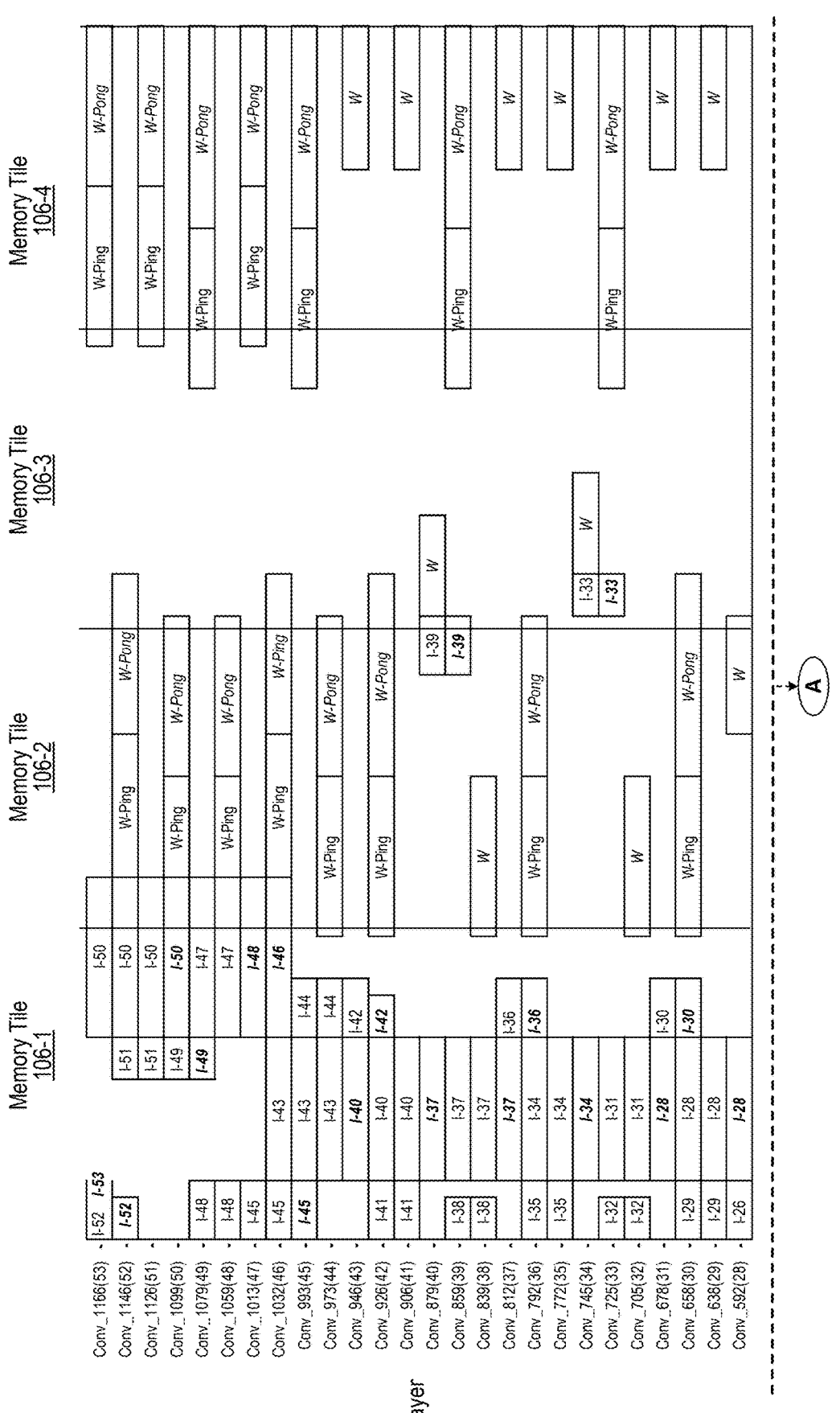
FIGS. 9A and 9B, taken collectively, illustrate another example of placement of buffers for level 2 memory for a machine learning model in accordance with one or more embodiments of the disclosed technology.
Figure 9B:
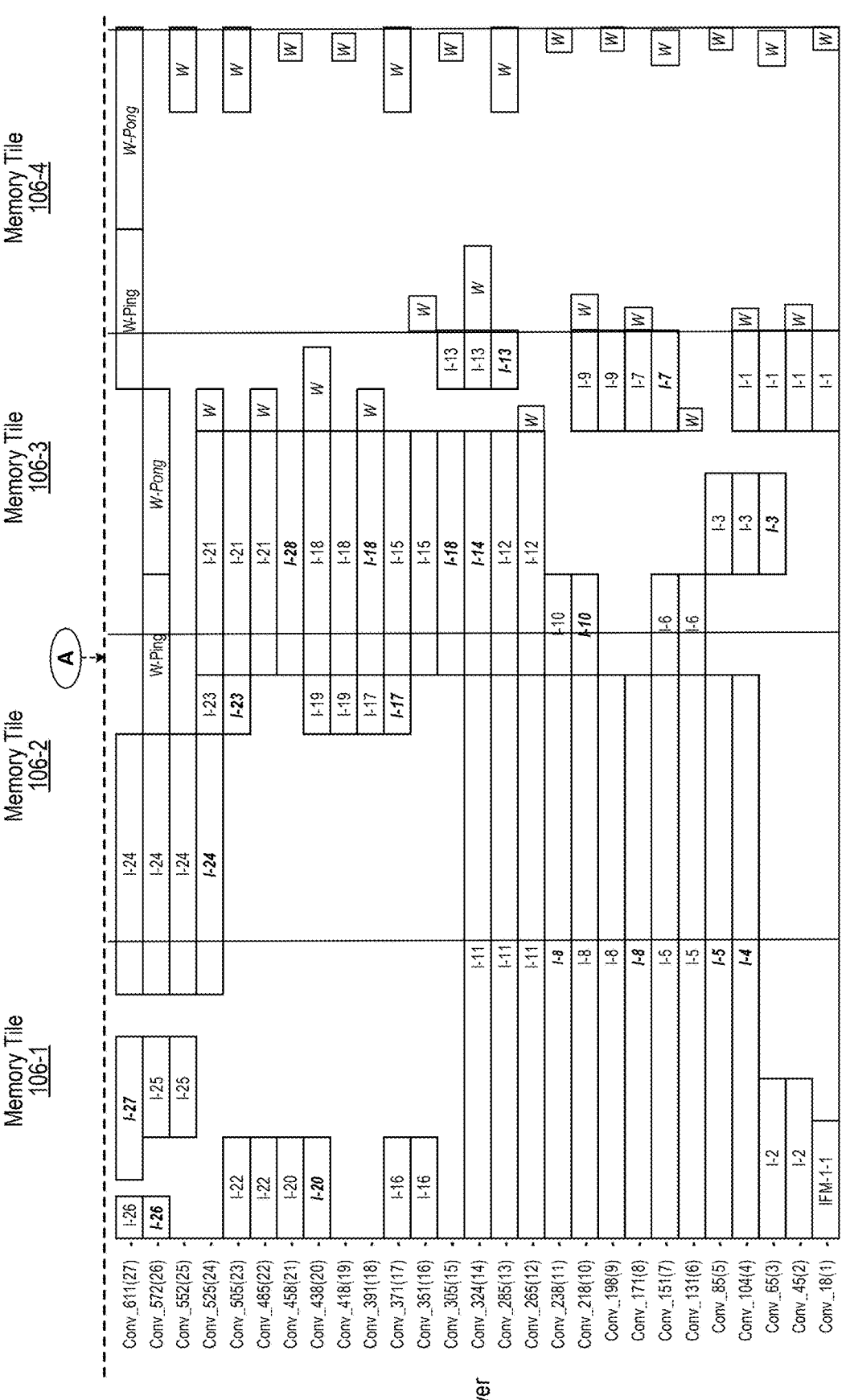

FIGS. 9A and 9B, taken collectively, illustrate another example of placement of buffers for level 2 memory for an ML model. The example of FIG. 9, in reference to FIGS. 9A and 9B collectively, illustrates buffer placement for a larger number of layers of the example of FIG. 8. Like in FIG. 8, for purposes of illustration, each row, which corresponds to a layer, represents a state of the level 2 memory for the time during which the respective layer is being processed.

In the example of FIG. 9, the designation of each buffer indicates the particular layer in which the buffer was initially placed or allocated. For example, the designation L-1 indicates that the buffer was initially placed for the first layer and, per FIG. 9, is re-used and/or re-purposed from layer 1, to layer 2, to layer 3, and to layer 4. Similarly, the buffer L-3 illustrates that the buffer was initially placed for layer 3 and was re-used for layers 3 and 4. Thus, any buffer labeled with a layer number that is located in the row of a different layer represents buffer-reuse. In general, each row will include one or more input buffers, one or more output buffers, and one or more weight buffers.

In higher numbered layers such as 26, 27, 30, etc., the system has allocated ping and pong buffers for weights to accommodate the particular architecture of the different convolutional layers of the ML model. The weights are labeled as W, W-Ping (the "ping" buffer in a ping-pong arrangement), and W-Pong (the "pong" buffer in a ping-pong arrangement). The ping-pong buffer arrangements increase processing throughput by reducing latency. For purposes of illustration, the weight buffers are not re-used from one layer to another as different weights are needed from one layer to the next.

FIGS. 8 and 9 illustrate how the system attempts to keep or maintain data in level 2 memory for as long as possible. Maintaining data in level 2 memory for as long as is possible per the ML model increases computational efficiency of data processing array 100 and reduces latency since the same data need not be moved needlessly out from level 2 memory to level 3 memory only to later move the same data back from level 3 memory to level 2 memory and into level 1 memory.

Figure 10:
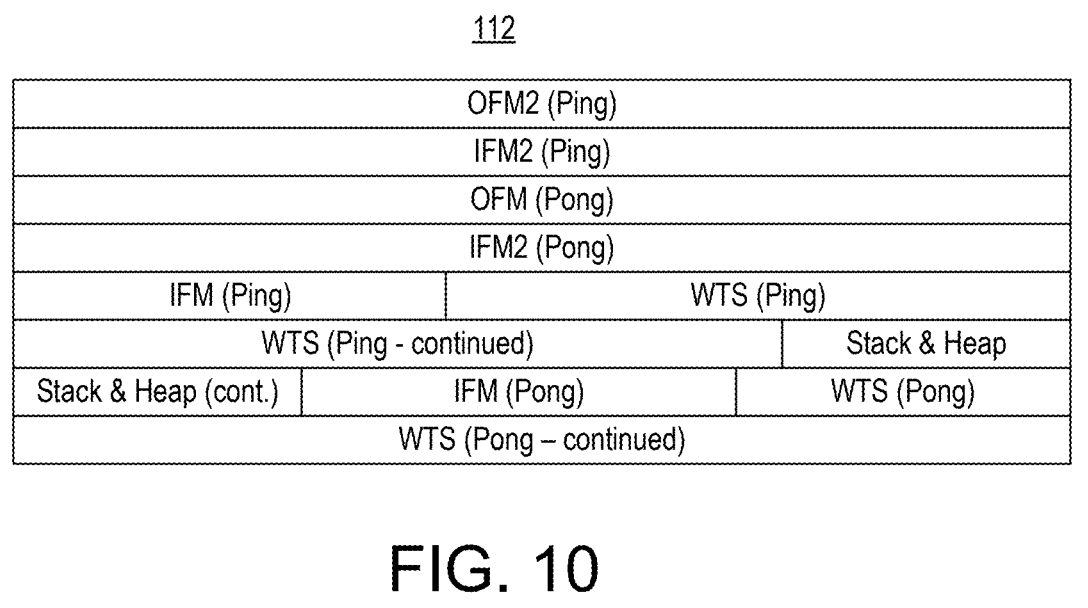

FIG. 10 illustrates an example placement of buffers for level 1 memory for an ML model. In the example, the system places buffers for input feature maps (IFMs) or input data, output feature maps (OFMs) or output data, weights which may include weights supporting ping-pong operation, and stack and heap. Like in the examples of FIGS. 8 and 9, different buffers of a data memory 112 may be re-used for a subsequent iteration (e.g., if the compute tile performs multiple iterations and/or operations per layer) and/or a subsequent layer. In general, a similar metric may be used by the system to maintain data in level 1 memory for as long as possible given the ML model being executed and the available store in each data memory 112.

In the example, the system finds a buffer placement for data memories 112 that accommodates all inputs, all outputs, and stack and heap. In one or more embodiments, to maximize the performance of the compute tile 102, all inputs and outputs are ping/pong to pipeline data transfers and compute operations. The ping and pong of the same buffer of each input/output further may be placed in different memory banks of data memories 112 to avoid performance bottlenecks in the data memories 112.

In block 222, the system generates a hardware implementation of the data movement network that is generated. For example, the system is capable of compiling the ML model as tiled including the information generated such as the physical connections, the scheduled data transfers, and the placed buffers, to generate configuration data that, when loaded into configuration registers of an electronic system including data processing array 100, physically realizes the data movement network in data processing array 100.

For example, the hardware implementation that implements the data movement network within the memory architecture specifies the physical connections, a schedule, and the buffers as placed. The configuration data, when loaded into data processing array 100, establishes the connections between level 3 memory, level 2 memory, and level 1 memory using DMA circuits and stream switches as described herein. The configuration data, for example, programs the DMA circuits and the stream switches to implement data transfers per the schedule using the buffers as placed to implement the data movement network.

Though not specifically discussed within this disclosure, the hardware implementation generated by the system also may generate compiled versions of kernels corresponding to nodes of the ML model (e.g., executable program code) and a mapping of the kernels as compiled to different compute tiles 102 of data processing array 100.

In block 224, the hardware implementation of the data movement network (e.g., the configuration data generated in block 222), may be loaded into the electronic system including the data processing array 100 to implement (e.g., physically realize) the data movement network and/or the ML model therein.

Figure 11:
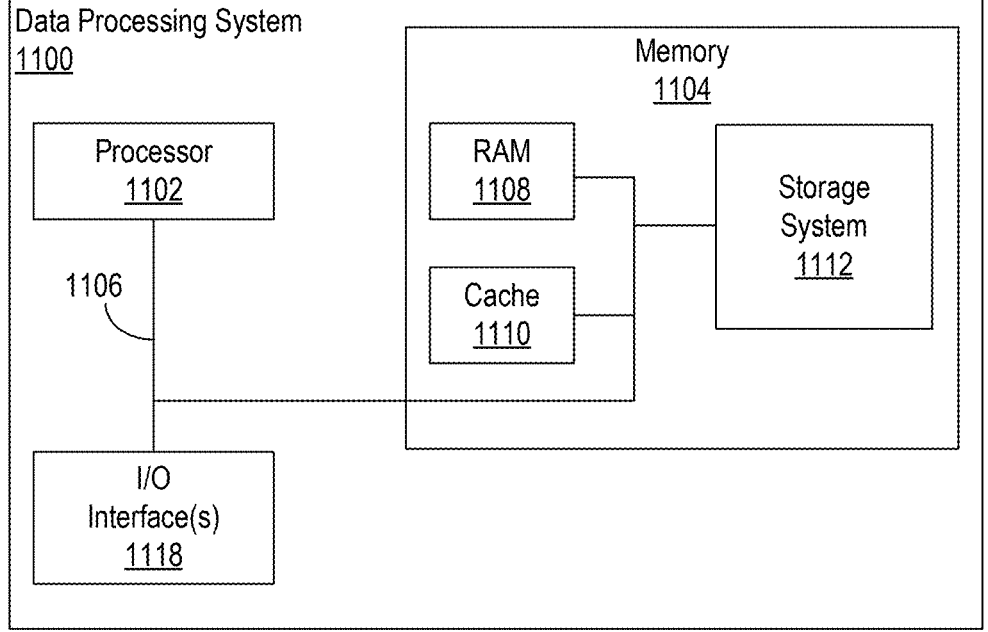
FIG. 11 illustrates an example implementation of a data processing system for use with the inventive arrangements described within this disclosure.

FIG. 11 illustrates an example implementation of a data processing system 1100. As defined herein, the term "data processing system" means one or more hardware systems configured to process data, each hardware system including at least one processor and memory, wherein the processor is programmed with computer-readable instructions that, upon execution, initiate operations. Data processing system 1100 can include a processor 1102, a memory 1104, and a bus 1106 that couples various system components including memory 1104 to processor 1102.

Processor 1102 may be implemented as one or more processors. In an example, processor 1102 is implemented as a central processing unit (CPU). Processor 1102 may be implemented as one or more circuits, e.g., hardware, capable of carrying out instructions contained in program code. The circuit may be an integrated circuit or embedded in an integrated circuit. Processor 1102 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1106 represents one or more of any of a variety of communication bus structures. By way of example, and not limitation, bus 1106 may be implemented as a Peripheral Component Interconnect Express (PCIe) bus. Data processing system 1100 typically includes a variety of computer system readable media. Such media may include computer-readable volatile and non-volatile media and computer-readable removable and non-removable media.

Memory 1104 can include computer-readable media in the form of volatile memory, such as random-access memory (RAM) 1108 and/or cache memory 1110. Data processing system 1100 also can include other removable/non-removable, volatile/non-volatile computer storage media. By way of example, storage system 1112 can be provided for reading from and writing to a non-removable, non-volatile magnetic and/or solid-state media (not shown and typically called a "hard drive"), which may be included in storage system 1112. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Memory 1104 is capable of storing computer-readable program instructions that are executable by processor 1102. For example, the computer-readable program instructions can include an operating system, one or more application programs, other program code, and program data. For example, the program code and/or applications may implement an Electronic Design Automation (EDA) system capable of performing the various operations described herein in connection with generating a data movement network for an ML model and/or physically realizing the ML model in hardware.

Processor 1102, in executing the computer-readable program instructions, is capable of performing the various operations described herein that are attributable to a computer. It should be appreciated that data items used, generated, and/or operated upon by data processing system 1100 are functional data structures that impart functionality when employed by data processing system 1100. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1100 may include one or more Input/Output (I/O) interfaces 1118 communicatively linked to bus 1106. I/O interface(s) 1118 allow data processing system 1100 to communicate with one or more external devices and/or communicate over one or more networks such as a local area network (LAN), a wide area network (WAN), and/or a public network (e.g., the Internet). Examples of I/O interfaces 1118 may include, but are not limited to, network cards, modems, network adapters, hardware controllers, etc. Examples of external devices also may include devices that allow a user to interact with data processing system 1100 (e.g., a display, a keyboard, and/or a pointing device) and/or other devices such as accelerator card.

Data processing system 1100 is only one example implementation. Data processing system 1100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 11 is not intended to suggest any limitation as to the scope of use or functionality of example implementations described herein. Data processing system 1100 is an example of computer hardware that is capable of performing the various operations described within this disclosure. In this regard, data processing system 1100 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a controller, and a Graphics Processing Unit (GPU).

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of implementing a data movement network, comprising:

tiling one or more layers of a machine learning model based, at least in part, on amounts of addressable memory available in different memory levels of a memory architecture of an electronic system;

generating logical connections specifying compute tiles of the electronic system and logical address spaces corresponding to the compute tiles;

creating physical connections within the memory architecture by binding ports of direct memory access circuits of the memory architecture to the logical connections;

scheduling data transfers for memories between the different memory levels; and placing buffers for data of the data transfers within the memories based on the scheduling, wherein the different memory levels are hierarchically ordered and include level 3 memory, level 2 memory comprising a plurality of memory tiles each having a direct memory access (DMA) circuit configured to move data, and level 1 memory comprising data memories of the compute tiles.

2. The method of claim 1, wherein the tiling is performed based, at least in part, on an amount of addressable memory available in the level 2 memory, an amount of addressable memory available in the level 1 memory, and a number of the compute tiles available.

3. The method of claim 1, wherein the tiling comprises: generating a level 3 memory to level 2 memory tiling based on an amount of available level 2 memory.

4. The method of claim 3, wherein the tiling comprises: generating a level 2 memory to level 1 memory tiling based on a size of the data memories of the level 1 memory and a number of available compute tiles.

5. The method of claim 1, wherein the ports of the direct memory access circuits are bound to the logical connections based, at least in part, on address ranges of the level 2 memory accessed by the compute tiles concurrently.

6. The method of claim 5, wherein for two or more compute tiles located in a same column that access same address ranges in the level 2 memory concurrently, providing data to the two or more compute tiles from the level 2 memory using a same direct memory access circuit of the level 2 memory.

7. The method of claim 1, further comprising: generating a hardware implementation that implements the data movement network within the memory architecture, wherein the hardware implementation specifies the physical connections, a schedule, and the buffers as placed.

8. A system for implementing a data movement network, comprising:

one or more hardware processors configured to execute operations including:

tiling one or more layers of a machine learning model based, at least in part, on amounts of addressable memory available in different memory levels of a memory architecture of an electronic system;

generating logical connections specifying compute tiles of the electronic system and logical address spaces corresponding to the compute tiles;

creating physical connections within the memory architecture by binding ports of direct memory access circuits of the memory architecture to the logical connections;

scheduling data transfers for memories between the different memory levels; and placing buffers for data of the data transfers within the memories based on the scheduling, wherein the different memory levels are hierarchically ordered and include level 3 memory, level 2 memory comprising a plurality of memory tiles, and level 1 memory comprising data memories of the compute tiles; and wherein the tiling comprises generating a level 3 memory to level 2 memory tiling based on an amount of available level 2 memory.

9. The system of claim 8, wherein the tiling is performed based, at least in part, on an amount of addressable memory available in the level 2 memory, an amount of addressable memory available in the level 1 memory, and a number of the compute tiles available.

10. The system of claim 8, wherein the tiling comprises: generating a level 2 memory to level 1 memory tiling based on a size of the data memories of the level 1 memory and a number of available compute tiles.

11. The system of claim 8, wherein the ports of the direct memory access circuits are bound to the logical connections based, at least in part, on address ranges of the level 2 memory accessed by the compute tiles concurrently.

12. The system of claim 11, wherein for two or more compute tiles located in a same column that access same address ranges in the level 2 memory concurrently, providing data to the two or more compute tiles from the level 2 memory using a same direct memory access circuit of the level 2 memory.

13. The system of claim 8, wherein the one or more hardware processors execute operations including:

generating a hardware implementation that implements the data movement network within the memory architecture, wherein the hardware implementation specifies the physical connections, a schedule, and the buffers as placed.

14. A computer program product comprising one or more computer readable storage mediums having program instructions embodied therewith, wherein the program instructions are executable by computer hardware to cause the computer hardware to initiate executable operations comprising:

tiling one or more layers of a machine learning model based, at least in part, on amounts of addressable memory available in different memory levels of a memory architecture of an electronic system;

generating logical connections specifying compute tiles of the electronic system and logical address spaces corresponding to the compute tiles;

creating physical connections within the memory architecture by binding ports of direct memory access circuits of the memory architecture to the logical connections;

scheduling data transfers for memories between the different memory levels; and placing buffers for data of the data transfers within the memories based on the scheduling, wherein the different memory levels are hierarchically ordered and include level 3 memory, level 2 memory comprising a plurality of memory tiles, and level 1 memory comprising data memories of the compute tiles; and wherein the tiling comprises generating a level 3 memory to level 2 memory tiling based on an amount of available level 2 memory.

15. The computer program product of claim 14, wherein the tiling is performed based, at least in part, on an amount of addressable memory available in the level 2 memory, an amount of addressable memory available in the level 1 memory, and a number of the compute tiles available.

16. The computer program product of claim 14, wherein the tiling comprises:

generating a level 2 memory to level 1 memory tiling based on a size of the data memories of the level 1 memory and a number of available compute tiles.

* * * * *